3,644,421
4-OXA-3-KETO-Δ¹-PREGNENE DERIVATIVES
Alexander D. Cross, Mexico City, Mexico, assignor to
Syntex Corporation, Panama, Panama
No Drawing. Continuation-in-part of application Ser. No.
411,554, Nov. 16, 1964, now Patent No. 3,417,106. This
application Dec. 2, 1968, Ser. No. 780,580
Int. Cl. C07d $19/00$
U.S. Cl. 260—340.5
8 Claims

ABSTRACT OF THE DISCLOSURE

This discloses, as new compounds, 4-oxa-3-keto-Δ¹-pregnene steroids including the 19-nor derivatives and those containing optional substitutions at positions C–16 and C–17α. These compounds are progestational agents, have anti-androgenic, anti-gonadotrophic, and estrogenic properties and are useful in fertility control, in the treatment of premenstrual tensions, in lowering blood cholesterol levels, and in the treatment of acne, benign prostate hypertrophy and hirsutism. Also disclosed are methods and intermediates useful for the preparation of these compounds.

---

This is a continuation-in-part of application Ser. No. 411,554, filed Nov. 16, 1964, now U.S. Pat. 3,417,106.

This invention relates to novel cyclopentanopolyhydrophenanthrene derivatives and to processes for the preparation thereof.

More particularly, this invention relates to novel 3,20-diketo-4-oxa-Δ¹-5α- and 5β-pregnenes (including 19-nor-Δ¹-pregnenes) represented by the general Formula V:

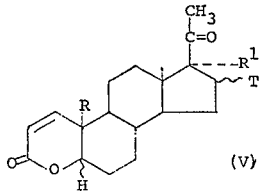

In this and succeeding formulas, R represents hydrogen or methyl, $R^1$ represents hydrogen, hydroxy, or acyloxy, T represents hydrogen, α-hydroxy, α-acyloxy, α-methyl, or β-methyl, with T being other than α-hydroxy or α-acyloxy when $R^1$ represents hydrogen, and $R^1$ and T taken together represent the grouping

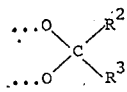

wherein $R^2$ represents lower alkyl or lower aryl containing up to eight carbon atoms, inclusive, and $R^3$ represents hydrogen or lower alkyl.

One particular group of important compounds hereof are the C–17α oxygenated derivatives, that is, those compounds depicted by Formula V above wherein $R^1$ is other than hydrogen.

In the present specification and claims, the term "lower alkyl" and "lower aryl" denote alkyl and aryl groups containing up to eight carbon atoms. Examples of such includes methyl, ethyl, propyl, butyl, pentyl, hexyl, phenyl, tolyl, xylyl, benzyl, and so forth. The term "acyloxy" refers to acyloxy groups which are derived from carboxylic acids containing less than 12 carbon atoms. These acids can be saturated or unsaturated (including aromatic), and can be straight or branched chain, cyclic or cyclic-aliphatic. In addition, they can be unsubstituted or substituted with one or more functional groups, such as hydroxyl groups, alkoxy groups containing up to six carbon atoms, acyloxy groups containing up to 12 carbon atoms, nitro groups, amino groups and halogen atoms. Included among such ester groups are acetate, trimethylacetate, t-butylacetate, aminoacetate, phenoxyacetate, propionate, cyclopentylpropionate, β-chloropropionate, β-chloropropionate, aminoacetate, caproate, enanthate, adamantoate, benzoate, bicyclo[2.2.2]oct-2-ene-1-carboxylate, bicyclo[2.2.2]octane - 1 - carboxylate and 4-methylbicyclo[2.2.2]oct-2-ene-1-carboxylate groups. In the present specification and claim, the wavy lines appearing in the structural formulas which connect the C–5 and C–16 carbon atoms to the hydrogen atom and T grouping, respectively, denote and include both the alpha (α) and beta (β) configurations.

The novel 3,20-diketo-4-oxa-Δ¹-5α- and 5β-pregnene and -19-norpregnene derivatives represented by Formula V hereinabove are progestational agents having oral activity. In addition, they have anti-androgenic, anti-estrogenic, anti-gonadotrophic and diuretic properties. They are accordingly useful in fertility control, in the treatment of premenstrual tension and in lowering blood cholesterol levels. They are also accordingly useful in the treatment of acne, benign prostate hypertrophy and hirsutism in females. In accordance with this utility, the compounds of the present invention are employed in the same manner as compounds having similar properties, such as progesterone, chlormadinone acetate, ethynyl estradiol, cyproterone acetate, and so forth. They can be administered by the usual routes, orally or parenterally, either alone or in conjunction with other medicinal agents or in pharmaceutically acceptable non-toxic compositions formed by the incorporation of any of the normally employed excipients.

The novel compounds of the present invention are prepared by a process which can be illustrated schematically as follows:

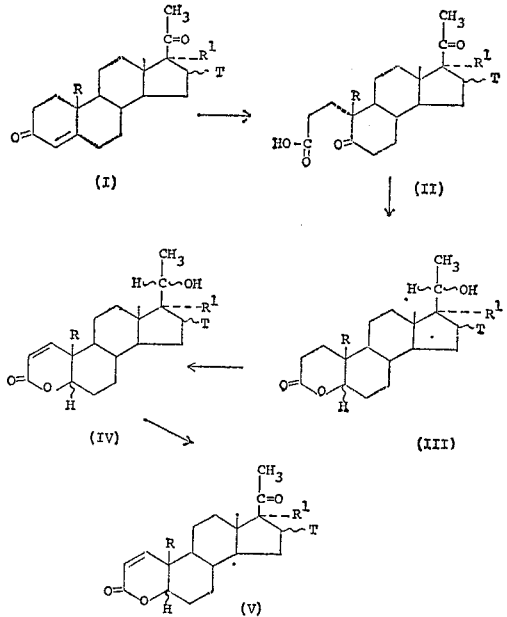

In carrying out this process, the starting material (I) is reacted together with a stream of ozone. This reaction is conveniently conducted in an organic reaction medium. Suitable media include methylene dichloride, ethyl acetate (which can a contain trace or larger amounts of acetic acid), chloroform, and the like. This reaction is further conducted at from about −100° C. to about −20° C. and preferably at about −70° C. and for a period of time sufficient to provide an excess of ozone in the reaction mixture. Following this period, the ozonized reaction mixture is reacted with an aqueous 30% solution of hydrogen peroxide in an amount of from about 0.5% to about 5% by volume, preferably about 1% by volume, based on the volume of the ozonized mixture, or with an equivalent amount of aqueous hydrogen peroxide solution of different concentration. This reaction is conducted at a temperature of from about −20° C. to about 30° C., preferably room temperature (about 25° C.) for from about 10 to about 40 hours. This described procedure provides the corresponding 3,5-seco-5-on-3-oic acid intermediate (II).

Alternatively, when the starting material (I) does not contain a 16α- or a 17α-hydroxy or -acyloxy group (for example, $R^1$ and T=hydrogen, or $R^1$+T=cycloalkylidenedioxy), the 3,5-seco-5-on-3-oic acid (II) can also be obtained by first reacting the starting material (I) with a strong oxidizing agent capable of attacking double bonds. Included among such oxidizing agents are the alkali metal permanganates, for example, potassium permanganate, and the like, which, upon ionization, produce anions having a reduction potential in the order of, or greater than, +0.5 volt, with respect to their nearest reduced state. This reaction is conveniently conducted in neutral or weakly basic solution which can be provided, for example, by aqueous potassium carbonate together with a strongly polar solvent, such as t-butanol, monoglyme, and the like. During this reaction, the reaction mixture is further treated with an alkali metal perhalate, such as sodium periodate, sodium metaperiodate, potassium perchlorate, or the like. The ensuing reaction is conducted at a temperature of from 0° C. to about 20° C. and for a period of time sufficient to produce the 3,5-seco-5-on-3-oic acid intermediate (II).

The thus-obtained 3,5-seco-5-on-3-oic acid (II) is reduced with an alkali metal borohydride, such as sodium borohydride, or the like. This reaction is conveniently conducted in an organic ether, such as dioxane, tetrahydrofuran, and the like, at a temperature of from about 0° C. to about 25° C. for a period of time ranging from a few minutes to about 12 to 24 hours. Upon reaction end the reaction mixture is acidified with a strong acid, for example, a strong mineral acid such as hydrochloric acid, or the like, preferably in an amount sufficient to give a pH of from about 1 to 4. Thus obtained is a mixture of the corresponding 4-oxa-5α-pregnan-20α-ol-3-one, 4-oxa-5β-pregnan-20α-ol-3-one, 4-oxa-5α-pregnan-20β-ol-3-one, and 4-oxa-5β-pregnan-20β-ol-3-one intermediates (III). These products can be separated into the individual isomers by fractional crystallization or standard chromatographic techniques. Alternatively, the mixture of 5- and 20-isomers, or a later-obtained mixture of 5α- and 5β-isomers, can be used as such in any subsequent reactions and the product thereafter separated into the individual isomers.

In the preparation of the corresponding $\Delta^1$-derivatives (IV) of the present invention, the mixture of 5- and 20-isomers (III) or any and each of them is reacted together with an excess, ranging upwards of a two-fold or more molar excess, of 2,3-dichloro-5,6-dicyano-1,4-benzoquinone. This reaction is conveniently conducted in organic liquid reaction medium, such as dioxane, tetrahydrofuran, monoglyme, diglyme, and the like, and at the boiling point of the mixture and under reflux for at least about 48 hours and preferably for not more than about 10 days. Again a mixture of the 5α,20α, 5β,20α, 5α,20β, 5β,20β isomers is obtained which can be respectively separated into the individual isomers in accordance with known procedures or utilized per se in the subsequent process step.

The thus prepared intermediates (IV) is oxidized under substantially anhydrous conditions with a carbodiimide in a hydrocarbon sulfoxide medium and in the presence of an acid catalyst. This reaction is preferably conducted from about 10° C. to about 100° C., preferably at room temperature, for from about 30 minutes to about 48 hours. Suitable carbodiimides include the N,N′-di(hydrocarbon substituted)carbodiimdes, preferably an N,N′-dialkyl-(including cycloalkyl)carbodiimide, for example, N,N′-di- methylcarbodiimidie, N,N′-di-n-propylcarbodiimide, N,N′-dibutylcarbodiimide, N,N′-dicyclohexylcarbodiimide, N,N′-di(methylcyclohexyl)carbodiimide, N,N′-di-p-tolylcarbodiimide, and the like. The amount employed can range from 1 to about 10 molar equivalents per mole equivalent of the 20-hydroxy compound. Suitable hydrocarbon sulfoxides include dimethylsulfoxide, diethylsulfoxide, tetramethylenesulfoxide, and the like. These can be used alone or in admixture with one or more mutually compatible inert organic solvent, such as benzene, toluene, xylene, dioxane, ethyl acetate, and the like. The acid catalyst for this reaction is employed in amounts of from about 0.01 to about 5 molar equivalents per mole of 20-hydroxy compound. Suitable acids include the oxyacids, for example, phosphoric acid, phosphorus acid, hypophosphorus acid, and the like; phosphorus acid derivatives, for example, acid phosphates, and other relatively strong acids, for example, p-toluenesulfonic acid, trifluoroacetic acid, and the pyridine salts of hydrochloric, sulfuric, perchloric, orthophosphoric and trifluoroacetic acids. The reaction is conducted under substantially anhydrous conditions. In a preferred procedure, the acid catalyst is added to a solution of the 20-hydroxy steroid and the carbodiimide in the hydrocarbon sulfoxide solvent or solvent mixture. They are then maintained together within the cited temperature range. Upon the completion of this reaction, the product compound of the present invention (V) is obtained.

Alternatively, the 20-hydroxy compound can be oxidized to the product (V) with chromium trioxide in tertiary amine solvent, such as pyridine, lutidine, and the like. This reaction is preferably conducted at or about room temperature for from 12 to 24 hours. During this oxidation procedure, hydroxyl groups at C–16α and C–17α, if present, are protected by conventional acylation or the formation of a cycloalkylidenedioxy derivative. These can be removed later, if desired, upon conventional hydrolysis.

Besides being prepared from 16α-hydroxyl or -acyloxy or 16α,17α-cycloalkylidenedioxy-containing starting materials, the final products of the present invention containing these 16-substituents can also be prepared, in certain cases, from a 16-desoxy-20-ol (III), a 16-desoxy-$\Delta^1$-20-ol (IV), or a 16-desoxy-$\Delta^1$-20-one (V). This is accomplished by first incubating with *Streptomyces roseochromogenus*, thereby giving the corresponding 16α-ol of the respective starting steroid.

Esterification of the 16α-hydroxyl group follows by conventional procedures, such as by reacting with an acid chloride or anhydride, for example, one corresponding to the carboxylic acids mentioned hereinabove, in pyridine, or the like, at room temperature for from about 12 to about 24 hours. In those instances when it is desired to simultaneously acylate a 17α-hydroxyl group, if present, the 16α,17α-diol is reacted with a mixture of an acid anhydride and the corresponding acid in the presence of a strong acid catalyst, for example, p-toluenesulfonic acid, or the like, at room temperature for from about 12 to 24 hours.

Similarly, by reacting a 16α,17α-diol (III), (IV) or (V) with an aldehyde or ketone in the presence of a strong acid catalyst in the manner described in U.S. Pat. No. 3,048,481, the corresponding 16α,17α-cycloalkylidenedioxy derivative is obtained.

When preparing 16-methyl-19-nor derivatives, the 16-methyl-19-nor starting materials (I) can be obtained in the manner described in U.S. Pat. No. 3,065,228. In this method 16(α or β)-methyl-19-hydroxypregnenolone or 16(α or β)-methyl-17α,19-dihydroxypregnenolone is first oxidized to give the corresponding 16(α or β)-methyl-$\Delta^4$-pregnen-19-(ol, one or oic acid)-3,20-dione or 16(α or β)-methyl-$\Delta^4$-pregnen-17α-ol-19-(ol, one or oic acid)-3,20-dione. The oxygenated 10β-methyl group of the thus formed derivative is then eliminated or decarboxylated by conventional procedures thus giving 16(α or β)-methyl-19-norprogesterone (I; R and R¹=hydrogen, T=methyl) or 16(α or β)-methyl-19-norpregn-4-en-17α-ol-3,20-dione (I; R=hydrogen, R¹=hydroxy, T=methyl). The latter can then be esterified at the 17-position, if desired, in the manner described hereinabove.

An illustrative but by no means exhaustive listing of 3,20-diketo-4-oxa-Δ¹-5α- and 5β-pregnenes falling within the scope of Formula V hereinabove which can be prepared by the above-illustrated process includes:

4-oxa-5α-pregn-1-ene-3,20-dione,
4-oxa-5β-pregn-1-ene-3,20-dione,
4-oxa-19-nor-5α-pregn-1-ene-3,20-dione,
4-oxa-19-nor-5β-pregn-1-ene-3,20-dione,
4-oxa-5α-pregn-1-en-17α-ol-3,20-dione,
4-oxa-17α-acetoxy-5α-pregn-1-ene-3,20-dione,
4-oxa-17α-acetoxy-5β-pregn-1-ene-3,20-dione,
4-oxa-17α-acetoxy-19-nor-5α-pregn-4-ene-3,20-dione,
4-oxa-17α-acetoxy-19-nor-5β-pregn-4-ene-3,20-dione,
4-oxa-5β-pregn-1-en-17α-ol-3,20-dione,
4-oxa-17α-propionoxy-5β-pregn-1-ene-3,20-dione,
4-oxa-17α-butyryloxy-19-nor-5α-pregn-1-ene-3,20-dione,
4-oxa-19-nor-5α-pregn-1-en-17α-ol-3,20-dione,
4-oxa-19-nor-5β-pregn-1-en-17α-ol-3,20-dione,
4-oxa-17α-caproyloxy-19-nor-5β-pregn-1-ene-3,20-dione,
4-oxa-16α-methyl-5α-pregn-1-ene-3,20-dione,
4-oxa-16α-methyl-5β-pregn-1-ene-3,20-dione,
4-oxa-16β-methyl-5β-pregn-1-ene-3,20-dione,
4-oxa-16α-methyl-19-nor-5α-pregn-1-ene-3,20-dione,
4-oxa-16β-methyl-19-nor-5α-pregn-1-ene-3,20-dione,
4-oxa-16α-methyl-19-nor-5β-pregn-1-ene-3,20-dione,
4-oxa-16β-methyl-19-nor-5β-pregn-1-ene-3,20dione-,
4-oxa-16α,17α-diacetoxy-5α-pregn-1-ene-,20-dione,
4-oxa-5β-pregn-1-ene-16α,17α-diol-3,20-dione,
4-oxa-16α,17α-diacetoxy-5β-pregn-1-ene-3,20-dione,
4-oxa-19-nor-5α-pregn-1-ene-16α,17α-diol-3,20-dione,
4-oxa-16α,17α-diacetoxy-19-nor-5α-pregn-1-ene-3,20-dione,
4-oxa-19-nor-5β-pregn-1-ene-16α,17α-diol-3,20-dione,
4-oxa-16α,17α-diacetoxy-19-nor-5β-pregn-1-ene-3,20-dione,
4-oxa-16α,17α-isopropylidenedioxy-5α-pregn-1-ene-3,20-dione,
4-oxa-16α,17α-isopropylidenedioxy-5β-pregn-1-ene-3,20-dione,
4-oxa-16α,17α-isopropylidenedioxy-19-nor-5α-pregn-1-ene-3,20-dione,
4-oxa-16α,17α-isopropylidenedioxy-19-nor-5β-pregn-1-ene-3,20-dione,
4-oxa-16α-methyl-5α-pregn-1-en-17α-ol-3,20-dione,
4-oxa-16α-methyl-17α-acetoxy-5α-pregn-1-ene-3,20-dione,
4-oxa-16α-methyl-17α-acetoxy-5β-pregn-1-ene-3,20-dione,
4-oxa-16α-methyl-17α-acetoxy-19-nor-5α-pregn-1-ene-3,20-dione,
4-oxa-16α-methyl-17α-acetoxy-19-nor-5β-pregn-1-ene-3,20-dione,
4-oxa-16β-methyl-5α-pregn-1-en-17α-ol-3,20-dione,
4-oxa-16β-methyl-17α-propionoxy-5α-pregn-1-ene-3,20-dione,
4-oxa-16α-methyl-5β-pregn-1-en-17α-ol-3,20-dione,
4-oxa-16α-methyl-17α-butyryloxy-5β-pregn-1-ene-3,20-dione,
4-oxa-16β-methyl-5β-pregn-1-en-17α-ol-3,20-dione,
4-oxa-16β-methyl-17α-caproyloxy-5β-pregn-1-ene-3,20-dione,
4-oxa-16α-methyl-19-nor-5α-pregn-1-en-17α-ol-3,20-dione,
4-oxa-16α-methyl-17α-β-chloropropionoxy-19-nor-5α-pregn-1-ene-3,20-dione,
4-oxa-16β-methyl-19-nor-5α-pregn-1-en-17α-ol-3,20-dione,
4-oxa-16β-methyl-17α-cyclopentylpropionoxy-19-nor-5α-pregn-1-ene-3,20-dione,
4-oxa-16α-methyl-19-nor-5β-pregn-1-en-17α-ol-3,20-dione,
4-oxa-16α-methyl-17α-heptanoyloxy-19-nor-5β-pregn-1-ene-3,20-dione,
4-oxa-16β-methyl-19-nor-5β-pregn-1-en-17α-ol-3,20-dione,
4-oxa-16β-methyl-17α-trimethylacetoxy-19-nor-5β-pregn-1-ene-3,20-dione.

The following examples serve to further typify the manner by which the present invention can be practiced but, as such, should not be construed as limitations upon the overall scope hereof.

EXAMPLE 1

A solution of 5.2 grams of progesterone, 50 cc. of glacial acetic acid and 50 cc. of ethyl acetate, contained in an ozonation tube, is cooled in an acetone-Dry Ice bath to about —70° C. At this point, a stream of ozone (0.024 mole/hour) is passed through the solution for two hours, following which 20 cc. of water and 3 cc. of an aqueous 30% hydrogen peroxide solution are added, with vigorous stirring. The resulting mixture is stirred for 17 hours at room temperature and then allowed to stand at room temperature for 48 hours. Following this reaction period, the solution is concentrated to a small volume under reduced pressure on a steam bath, then diluted with 20 cc. of methanol and poured into water. The thus obtained mixture is extracted with diethyl ether, and the resulting extracts are washed with water, then dried over sodium sulfate and evaporated to dryness. The resulting residue is chromatographed on 250 grams of alumina to obtain the 3,5-secopregnane-5,20-dion-3-oic acid product.

This procedure is repeated in every detail except progesterone is replaced by 19-norprogesterone, pregn-4-en-17α-ol-3,20-dione,
17α-acetoxypregn-4-ene-3,20-dione,
19-norpregn-4-en-17α-ol-3,20-dione,
17α-acetoxy-19-norpregn-4-ene-3,20-dione,
16-methylpregn-4-ene-3,20-dione,
16β-methylpregn-4-ene-3,20-dione,
16α-methyl-19-norpregn-4-ene-3,20-dione,
16β-methyl-19-norpregn-4-ene-3,20-dione,
16α,17α-ethylidenedioxypregn-4-ene-3,20-dione,
16α,17α-isopropylidenedioxypregn-4-ene-3,20-dione,
16α,17α-(1′-phenylethylidenedioxy)-pregn-4-ene-3,20-dione,
16α,17α-isopropylidenedioxy-19-norpregn-4-ene-3,20-dione,
16α-methylpregn-4-en-17α-ol-3,20-dione,
16α-methyl-17α-propionoxypregn-4-ene-3,20-dione,
16β-methylpregn-4-en-17α-ol-3,20-dione,
16β-methyl-17α-butyryloxypregn-4-ene-3,20-dione,
16α-methyl-19-norpregn-4-en-17α-ol-3,20-dione,
16α-methyl-17α-caproyloxy-19-norpregn-4-ene-3,20-dione,
16β-methyl-19-norpregn-4-en-17α-ol-3,20-dione, and
16β-methyl-17α-heptanoyloxy-19-norpregn-4-en-17α-ol-3,20-dione, respectively. In each case, the corresponding 3,5-seco-5-on-3-oic acid, namely, 19-nor-3,5-secopregnane-5,20-dion-3-oic acid,
3,5-secopregnan-17α-ol-5,20-dion-3-oic acid,
3,5-seco-17α-acetoxypregnane-5,20-dion-3-oic acid,
19-nor-3,5-secopregnan-17α-ol-5,20-dion-3-oic acid,
17α-acetoxy-19-nor-3,5-secopregnane-5,20-dion-3-oic acid,
16α-methyl-3,5-secopregnane-5,20-dion-3-oic acid,
16β-methyl-3,5-secopregnane-5,20-dion-3-oic acid,
16α-methyl-19-nor-3,5-secopregnane-5,20-dion-3-oic acid,
16β-methyl-19-nor-3,5-secopregnane-5,20-dion-3-oic acid,
16α,17α-ethylidenedioxy-3,5-secopregnane-5,20-dion-3-oic acid, 16α,17α-isopropylidenedioxy-3,5-secopregnane-5,20-dion-3-oic acid,
16α,17α-(1'-phenylethylidenedioxy)-3,5-secopregnane-5,20-dione-3-oic acid,
16α,17α-isopropylidenedioxy-19-nor-3,5-secopregnane-5,20-dion-3-oic acid,
16α-methyl-3,5-secopregnan-17α-ol-5,20-dion-3-oic acid,
16α-methyl-17α-propionoxy-3,5-secopregnane-5,20-dion-3-oic acid,
16β-methyl-3,5-secopregnan-17α-ol-5,20-dion-3-oic acid,
16β-methyl-17α-butyryloxy-3,5-secopregnane-5,20-dion-3-oic acid,
16α-methyl-19-nor-3,5-secopregnan-17α-ol-5,20-dion-3-oic acid,
16α-methyl-17α-caproyloxy-19-nor-3,5-secopregnane-5,20-dion-3-oic acid,
16β-methyl-19-nor-3,5-secopregnan-17α-ol-5,20-dion-3-oic acid, and
16β-methyl-17α-heptanoyloxy-19-nor-3,5-secopregnane-5,20-dion-3-oic acid products, respectively, is obtained.

EXAMPLE 2

An aqueous sodium periodate solution was prepared by dissolving 20 grams of sodium periodate in 250 cc. of water.

To a solution of 5 grams of progesterone in 300 cc. of an azeotrophic mixture of t-butanol and water there is added, with stirring, a solution of 2.8 grams of potassium carbonate in 80 cc. of water, followed by 50 cc. of the above-prepared sodium periodate solution and 5 cc. of an 0.8% solution of potassium permanganate in water. Next, the remainder of the sodium periodate solution is added in small portions, with further amounts of the potassium permanganate solution also being added as necessary to maintain the characteristic color.

Following the addition of the last of the sodium periodate solution, the resulting reaction mixture is allowed to stand at room temperature for two hours, then admixed with aqueous sodium bisulfite solution to destroy excess potassium permanganate, and finally concentrated to a volume of 400 cc., cooled to 4° C., acidified with ice-cold aqueous 50% sulfuric acid and extracted with methylene dichloride. The thus obtained extract is washed with an aqueous sodium bisulfite solution until free of iodine, then with water until neutral, and then dried over anhydrous sodium sulfate and evaporated to dryness under reduced pressure. The resultant residue is chromatographed on silica gel to obtain the 3,5-secopregnane-5,20-dion-3-oic acid product.

EXAMPLE 3

A solution of 1 gram of sodium borohydride in 3 cc. of water is added to an ice-cold solution of 1 gram of 3,5-secopregnane-5,20-dion-3-oic acid in 120 cc. of dioxane, and the resulting reaction mixture is allowed to stand for 16 hours at 0° C. Following this reaction period, the reaction mixture is adjusted to pH 1 by the addition of 6 N hydrochloric acid (this also serves to decompose the excess sodium borohydride present) and the resulting precipitate is collected by filtration to obtain a mixture of 4-oxa-5α-pregnan-20α-ol-3-one, 4-oxa-5β-pregnan-20α-ol-3-one, 4-oxa-5α-pregnan-20β-ol-3-one, and 4-oxa-5β-pregnan-20β-ol-3-one products. The mixture is then separated into the individual isomers by chromatography on alumina followed by individual recrystallization from acetone:hexane.

By repeating this procedure using the remaining 3,5-sec-5-on-3-oic acid products prepared as described in Example 1 hereinabove as the steroid starting materials, the corresponding 4-oxa-5(α and β)pregnan-20(α and β)ol-3-ones, namely, 4-oxa-19-nor-5(α and β)pregnan-20(α and β)ol-3-one,
4-oxa-5(α and β)pregnane-17α,20(α and β)diol-3-one,
4-oxa-17α-acetoxy-5(α and β) pregnan-20(α and β)-3-one,
4-oxa-19-nor-5(α and β)pregnane-17α,20(α and β)diol-3-one,
4-oxa-17α-acetoxy-19-nor-5(α and β)pregnan-20(α and β)ol-3-one,
4-oxa-16α-methyl-5(α and β)pregnan-20(α and β)ol-3-one,
4-oxa-16α-methyl-19-nor-5(α and β)pregnan-20(α and β)ol-3-one,
4-oxa-16β-methyl-19-nor-5(α and β)pregnan-20(α and β)ol-3-one,
4-oxa-16α,17α-ethylidenedioxy-5(α and β)pregnan-20(α and β)ol-3-one,
4-oxa-16α,17α-isopropylidenedioxy-5(α and β)pregnan-20-(α and β)ol-3-one,
4-oxa-16α,17α-(1'-phenylethylidenedioxy)-5(α and β)pregnan-20(α and β)ol-3-one,
4-oxa-16α,17α-isopropylidenedioxy-19-nor-5(α and β)pregnan-20(α and β)ol-3-one,
4-oxa-16α-methyl-5(α and β)pregnane-17α,20(α and β)diol-3-one,
4-oxa-16α-methyl-17α-propionoxy-5(α and β)pregnan-20(α and β)ol-3-one,
4-oxa-16β-methyl-5(α and β)pregnane-17α,20(α and β)diol-3-one,
4-oxa-16β-methyl-17α-butyryloxy-5(α and β)pregnan-20(α and β)ol-3-one,
4-oxa-16α-methyl-19-nor-5(α and β)pregnane-17α,20(α and β)diol-3-one,
4-oxa-16α-methyl-17α-caproyloxy-19-nor-5-(α and β)pregnan-20(α and β)ol-3-one,
4-oxa-16β-methyl-19-nor-5(α and β)pregnane-17α,20(α and β)diol-3-one, and
4-oxa-16β-methyl-17α-heptanoyloxy-19-nor-5(α and β)pregnan-20(α and β)ol-3-one products, respectively, are obtained and then separated into the individual isomers by chromatography on alumina followed by individual recrystallization from acetone:hexane.

EXAMPLE 4

A mixture of 350 mg. of 2,3-dichloro-5,6-dicyano-1,4-benzoquinone, 10 cc. of dioxane and 500 mg. of 4-oxa-5α-pregnan-20α-ol-3-one is refluxed for 50 hours. Following this reaction period, the reaction mixture is cooled to room temperature, filtered to remove the 2,3-dichloro-5,6-dicyano-1,4-benzohydroquinone formed during the reaction, and the filtrate then evaporated to dryness. Next, the dry residue is dissolved in acetone and filtered through 10 grams of alumina, following which the filtrate is evaporated to dryness. The resulting residue is crystallized from acetone:hexane to obtain 4-oxa-5α-pregn-1-en-20α-ol-3-one product.

By repeating this procedure using the remaining 4-oxa-5(α and β)pregnan-20(α and β)ol-3-ones prepared as described in Example 3 hereinabove, the corresponding Δ¹ steroids, namely, 4-oxa-5β-pregn-1-en-20α-ol-3-one,
4-oxa-5α-pregn-1-en-20β-ol-3-one,
4-oxa-5β-pregn-1-en-20β-ol-3-one,
4-oxa-19-nor-5α-pregn-1-en-20α-ol-3-one,
4-oxa-19-nor-5β-pregn-1-en-20α-ol-3-one,
4-oxa-19-nor-5α-pregn-1-en-20β-ol-3-one,
4-oxa-19-nor-5β-pregn-1-en-20β-ol-3-one,
4-oxa-5α-pregn-1-ene-17α,20α-diol-3-one,
4-oxa-5β-pregn-1-ene-17α,20α-diol-3-one,
4-oxa-5α-pregn-1-ene-17α,20β-diol-3-one,
4-oxa-5β-pregn-1-ene-17α,20β-diol-3-one,
4-oxa-17α-acetoxy-5α-pregn-1-en-20α-ol-3-one,
4-oxa-17α-acetoxy-5β-pregn-1-en-20α-ol-3-one,
4-oxa-17α-acetoxy-5α-pregn-1-en-20β-ol-3-one,
4-oxa-17α-acetoxy-5β-pregn-1-en-20β-ol-3-one,
4-oxa-19-nor-5α-pregn-1-ene-17α,20α-diol-3-one,
4-oxa-19-nor-5β-pregn-1-ene-17α,20α-diol-3-one,
4-oxa-19-nor-5α-pregn-1-ene-17α,20β-diol-3-one,
4-oxa-19-nor-5β-pregn-1-ene-17α,20β-diol-3-one,
4-oxa-17α-acetoxy-19-nor-5α-pregn-1-en-20α-ol-3-one, 4-oxa-17α-acetoxy-19-nor-5β-pregn-1-en-20α-ol-3-one,
4-oxa-17α-acetoxy-19-nor-5α-pregn-1-en-20β-ol-3-one,
4-oxa-17α-acetoxy-19-nor-5β-pregn-1-en-20β-ol-3-one,
4-oxa-16α-methyl-5α-pregn-1-en-20α-ol-3-one,
4-oxa-16α-methyl-5β-pregn-1-en-20α-ol-3-one,
4-oxa-16α-methyl-5α-pregn-1-en-20β-ol-3-one,
4-oxa-16α-methyl-5β-pregn-1-en-20β-ol-3-one,
4-oxa-16β-methyl-5α-pregn-1-en-20α-ol-3-one,
4-oxa-16β-methyl-5β-pregn-1-en-20α-ol-3-one,
4-oxa-16β-methyl-5α-pregn-1-en-20β-ol-3-one,
4-oxa-16β-methyl-5β-pregn-1-en-20β-ol-3-one,
4-oxa-16α-methyl-19-nor-5α-pregn-1-en-20α-ol-3-one,
4-oxa-16α-methyl-19-nor-5β-pregn-1-en-20α-ol-3-one,
4-oxa-16α-methyl-19-nor-5α-pregn-1-en-20β-ol-3-one,
4-oxa-16α-methyl-19-nor-5β-pregn-1-en-20β-ol-3-one,
4-oxa-16β-methyl-19-nor-5α-pregn-1-en-20α-ol-3-one,
4-oxa-16β-methyl-19-nor-5β-pregn-1-en-20α-ol-3-one,
4-oxa-16β-methyl-19-nor-5α-pregn-1-en-20β-ol-3-one,
4-oxa-16β-methyl-19-nor-5β-pregn-1-en-20β-ol-3-one,
4-oxa-16α,17α-ethylidenedioxy-5α-pregn-1-en-20α-ol-3-one,
4-oxa-16α,17α-ethylidenedioxy-5β-pregn-1-en-20α-ol-3-one,
4-oxa-16α,17α-ethylidenedioxy-5α-pregn-1-en-20β-ol-3-one,
4-oxa-16α,17α-ethylidenedioxy-5β-pregn-1-en-20β-ol-3-one,
4-oxa-16α,17α-isopropylidenedioxy-5α-pregn-1-en-20α-ol-3-one,
4-oxa-16α,17α-isopropylidenedioxy-5β-pregn-1-en-20α-ol-3-one,
4-oxa-16α,17α-isopropylidenedioxy-5α-pregn-1-en-20β-ol-3-one,
4-oxa-16α,17α-isopropylidenedioxy-5β-pregn-1-en-20β-ol-3-one,
4-oxa-16α,17α-(1'-phenylethylidenedioxy)-5α-pregn-1-en-20α-ol-3-one,
4-oxa-16α,17α-(1'-phenylethylidenedioxy)-5β-pregn-1-en-20α-ol-3-one,
4-oxa-16α,17α-(1'-phenylethylidenedioxy)-5α-pregn-1-en-20β-ol-3-one,
4-oxa-16α,17α-(1'-phenylethylidenedioxy)-5β-pregn-1-en-20β-ol-3-one,
4-oxa-16α,17α-isopropylidenedioxy-19-nor-5α-pregn-1-en-20α-ol-3-one,
4-oxa-16α-17α-isopropylidenedioxy-19-nor-5β-pregn-1-en-20α-ol-3-one,
4-oxa-16α,17α-isopropylidenedioxy-19-nor-5α-pregn-1-en-20β-ol-3-one,
4-oxa-16α,17α-isopropylidenedioxy-19-nor-5β-pregn-1-en-20β-ol-3-one,
4-oxa-16α-methyl-5α-pregn-1-ene-17α,20α-diol-3-one,
4-oxa-16α-methyl-5β-pregn-1-ene-17α,20α-diol-3-one,
4-oxa-16α-methyl-5α-pregn-1-ene-17α,20β-diol-3-one,
4-oxa-16α-methyl-5β-pregn-1-ene-17α,20β-diol-3-one,
4-oxa-16α-methyl-17α-propionoxy-5α-pregn-1-en-20α-ol-3-one,
4-oxa-16α-methyl-17α-propionoxy-5β-pregn-1-en-20α-ol-3-one,
4-oxa-16α-methyl-17α-propionoxy-5α-pregn-1-en-20β-ol-3-one,
4-oxa-16α-methyl-17α-propionoxy-5β-pregn-1-en-20β-ol-3-one,
4-oxa-16β-methyl-5α-pregn-1-ene-17α,20α-diol-3-one,
4-oxa-16β-methyl-5β-pregn-1-ene-17α,20α-diol-3-one,
4-oxa-16β-methyl-5α-pregn-1-ene-17α,20β-diol-3-one,
4-oxa-16β-methyl-5β-pregn-1-ene-17α,20β-diol-3-one,
4-oxa-16β-methyl-17α-butyryloxy-5α-pregn-1-en-20α-ol-3-one,
4-oxa-16β-methyl-17α-butyryloxy-5β-pregn-1-en-17α,20α-ol-3-one,
4-oxa-16β-methyl-17α-butyryloxy-5α-pregn-1-en-17α-20β-ol-3-one,
4-oxa-16β-methyl-17α-butyryloxy-5β-pregn-1-en-17α-20β-ol-3-one,
4-oxa-16α-methyl-19-nor-5α-pregn-1-en-17α,20α-ol-3-one,
4-oxa-16α-methyl-19-nor-5β-pregn-1-en-17α,20α-ol-3-one,
4-oxa-16α-methyl-19-nor-5α-pregn-1-en-17α,20β-ol-3-one,
4-oxa-16α-methyl-19-nor-5β-pregn-1-en-17α,20β-ol-3-one,
4-oxa-16α-methyl-17α-caproyloxy-19-nor-5α-pregn-1-en-20α-ol-3-one,
4-oxa-16α-methyl-17α-caproyloxy-19-nor-5β-pregn-1-en-17α,20α-ol-3-one,
4-oxa-16α-methyl-17α-caproyloxy-19-nor-5α-pregn-1-en-17α,20β-ol-3-one,
4-oxa-16α-methyl-17α-caproyloxy-19-nor-5β-pregn-1-ene-17α,20β-diol-3-one,
4-oxa-16β-methyl-19-nor-5α-pregn-1-en-17α,20α-ol-3-one,
4-oxa-16β-methyl-19-nor-5β-pregn-1-en-17α,20α-ol-3-one,
4-oxa-16β-methyl-19-nor-5α-pregn-1-en-17α,20α-ol-3-one,
4-oxa-16β-methyl-19-nor-5β-pregn-1-en-17α,20α-ol-3-one,
4-oxa-16β-methyl-17α-heptanoyloxy-19-nor-5α-pregn-1-en-20α-ol-3-one,
4-oxa-16β-methyl-19-nor-5α-pregn-1-en-17α,20β-ol-3-one,
4-oxa-16β-methyl-17α-heptanoyloxy-19-nor-5α-pregn-1-en-17α,20α-ol-3-one,
4-oxa-16β-methyl-17α-heptanoyloxy-19-nor-5β-pregn-1-en-17,20α-ol-3-one,
4-oxa-16β-methyl-17α-heptanoyloxy-19-nor-5α-pregn-1-en-17α,20β-ol-3-one, and
4-oxa-16β-methyl-17α-heptanoyloxy-19-nor-5β-pregn-1-en-17α,20β-ol-3-one products, respectively, are obtained.

EXAMPLE 5

A substantially anhydrous solution is prepared by dispersing 0.3 mmole of 4-oxa-5α-pregn-1-en-20α-ol-3-one and 0.9 mmole of N,N'-dicyclohexylcarbodiimide in 1.5 ml. of dimethylsulfoxide. To the resultant solution is added 0.15 mmole of substantially anhydrous trifluoroacetic acid. The resulting reaction mixture is maintained at room temperature for two hours with stirring and then an additional 0.3 mmole of substantially anhydrous N,N'-dicyclohexylcarbodiimide is added thereto. The reaction mixture is then allowed to stand at room temperature for three hours and an additional 0.3 mmole of substantially anhydrous N,N'-dicyclohexylcarbodiimide is added. The reaction mixture is then allowed to stand at room temperature for another hour and is then evaporated to dryness under vacuum. The resulting residue is separated by thin layer chromatography on Silica G in the system chloroform:ethyl acetate (4:1), eluting with methanol, to obtain the 4-oxa-5α-pregn-1-ene-3,20-dione product.

By repeating this procedure using the remaining 4-oxa-5(α and β)pregn-1-en-20(α and β)ol-3-ones prepared as described in Example 4 hereinabove, the corresponding 3,20-dione products are obtained, that is, 4-oxa-5β-pregn-1-ene-3,20-dione, 4-oxa-19-nor-5α-pregn-1-ene-3,20-dione, 4-oxa-19-nor-5β-pregn-1-ene-3,20-dione, 4-oxa-5α-pregn-4-en-17α-ol-3,20-dione, and so forth.

Alternatively, the oxidation can be conducted as follows:

One gram of 4-oxa-5α-pregn-1-en-20α-ol-3-one is dissolved in 20 cc. of pyridine and then added to a mixture of 1 gram of chromium trioxide in 20 cc. of pyridine. The resulting reaction mixture is allowed to stand at room temperature overnight. Following this reaction period, the reaction mixture is diluted with ethyl acetate and filtered through Celite. The filtrate is thoroughly washed with water, dried over anhydrous sodium sulfate and evaporated to dryness. The resulting residue is crystallized from acetone:hexane to obtain the 4-oxa-5α-pregn-1-ene-3,20-dione product.

EXAMPLE 6

A mixture of 1 gram of 4-oxa-5α-pregn-1-en-17α-ol-3,20-dione, 50 cc. of acetic acid, 25 cc. of acetic anhydride and 1 gram of p-toluenesulfonic acid monohydrate is allowed to stand at room temperature for 24 hours. Following this reaction period, the reaction mixture is poured into water and stirred until excess acetic anhydride hydrolyzes. The product is extracted with methylene dichloride. The thus obtained extract is washed with water until neutral, then dried over anhydrous sodium sulfate and evaporated to dryness. The resulting residue is crystallized from acetone:diethyl ether to obtain the 4-oxa-17α-acetoxy-5α-pregn-1-ene-3,20-dione product.

By repeating this procedure using 4-oxa-5β-pregn-1-en-17α-ol-3,20-dione,
4-oxa-19-nor-5α-pregn-1-en-17α-ol-3,20-dione,
4-oxa-19-nor-5β-pregn-1-en-17α-ol-3,20-dione,
4-oxa-16α-methyl-5α-pregn-1-en-17α-ol-3,20-dione,
4-oxa-16α-methyl-5β-pregn-1-en-17α-ol-3,20-dione,
4-oxa-16β-methyl-5α-pregn-1-en-17α-ol-3,20-dione,
4-oxa-16β-methyl-5α-pregn-1-en-17α-ol-3,20-dione,
4-oxa-16β-methyl-5β-pregn-1-en-17α-ol-3,20-dione,
4-oxa-16α-methyl-19-nor-5α-pregn-1-en-17α-ol-3,20-dione,
4-oxa-16α-methyl-19-nor-5β-pregn-1-en-17α-ol-3,20-dione,
4-oxa-16β-methyl-19-nor-5α-pregn-1-en-17α-ol-3,20-dione,
4-oxa-16β-methyl-19-nor-5β-pregn-1-en-17α-ol-3,20-dione, respectively, as the steroid starting materials, the corresponding 17-acetate products are obtained.

Similarly, by using each of the free 17α-ols mentioned above as the steroid starting material, and replacing the mixture of acetic acid and acetic anhydride with mixtures of propionic acid and propionic anhydride, cyclopentylpropionic acid and cyclopentylpropionic anhydride, caproic acid and caproic anhydride and enanthic acid and enanthic anhydride, respectively, the corresponding 17-propionates, -cyclopentylproprionates, -caproates and -enanthates are obtained.

Similarly, by using each of thef ree 17α-ols mentioned above as the steriod starting material, and replacing the mixture of acetic acid and acetic anhydride with mixtures of propionic acid and propionic anhydride, cyclopentylpropionic acid and cyulopentylpropionic anhydride, caproic acid and caproic anhydride and enanthic acid and

EXAMPLE 7

A culture of *Streptomyces roseochromogenus*, ATCC No. 3347, is prepared in an inclined agar medium containing 1% by weight of glucose and 1% by weight of yeast extract, each of these percentages being based on the total weight of said agar medium. A number of 250 cc. of Erlenmeyer flasks, each containing 50 cc. of a sterilized aqueous medium containing 2% by weight of peptone and 5% by weight of corn syrup, said percentages being based on the total weight of said aqueous medium, are then inoculated with 1 cc. of a suspension of the above-prepared culture, and the resulting mixtures are then incubated with aeration and agitation, at 28° C. for 48 hours. This gives a vegetating, growing culture of *Streptomyces roseochromogenus*.

Next, 10 mg. of 4-oxa-5α-pregn-1-en-17α-ol-3,20-dione are added to each flask and the resulting mixtures are stirred for 72 hours at room temperature with aeration. Following this incubation period, the incubated mixtures are combined and extracted with methylene dichloride. The thus obtained extracts are washed with water, dried over anhydrous sodium sulfate, filtered and evaporated to dryness under reduced pressure. The resulting residue is pregn-1-ene-16α,17α-diol-3,20-dione product.

This procedure is then repeated in every detail except 4-oxa-5β-pregn-1-en-17α-ol-3,20 - dione, 4-oxa-19-nor-5α-pregn-1-en-17α-ol-3,20-dione, and 4-oxa-19-nor-5β-pregn-1-en-17α-ol-3,20-dione, respectively, are used as the steroid starting materials. In each case, the corresponding 16α-hydroxy steroid product is obtained.

EXAMPLE 8

The procedure of Example 6 hereinabove is again repeated using each of the 16α-hydroxy steroids prepared as described in Example 7 hereinabove as the steroid starting material to obtain the 4-oxa-16α,17α-diacetoxy-5α-pregn-1-ene-3,20-dione, 4 - oxa - 16α,17α-diacetoxy-5β-pregn-1-ene-3,20-dione, 4-oxa-16α,17α-diacetoxy-19-nor-5α-pregn-1-ene-3,20-dione, and 4-oxa-16α,17α-diacetoxy - 19 - nor-5β-pregn-1-ene-3,20-dione, respectively.

What is claimed is:

1. The compound represented by the formula:

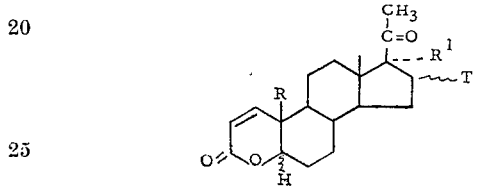

wherein R is hydrogen or methyl; $R^1$ is hydrogen, hydroxy or hydrocarbon carboxylic acyloxy containing less than 12 carbon atoms, T is hydrogen, α-hydroxy, α-hydrocarbon carboxylic acyloxy containing less than 12 carbon atoms, α-methyl or β-methyl, with T being other than α-hydroxy or α-hydrocarbon carboxylic acyloxy when $R^1$ is hydrogen, and $R^1$ and T taken together represent the grouping

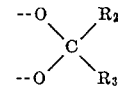

wherein $R^2$ is alkyl of up to eight carbon atoms or monocyclic aryl of six to eight carbon atoms, and $R^3$ is hydrogen or alkyl of up to eight carbon atoms, provided that when each of $R^1$ and T is hydrogen, then R is hydrogen.

2. The compound claimed in claim 1 wherein $R^1$ is hydrogen, hydroxy or acetoxy, and T is hydrogen or α-methyl, and $R^1$ and T taken together is isopropylidenedioxy.

3. The compound claimed in claim 1 wherein $R^1$ is hydroxy and T is hydrogen.

4. The compound in claim 1 wherein $R^1$ is acetoxy and T is hydrogen.

5. The compound claimed in claim 1 wherein $R^1$ is hydrogen and T is α-methyl.

6. The compound claimed in claim 1 wherein $R^1$ is hydroxy and T is α-methyl.

7. The compound claimed in claim 1 wherein $R^1$ is acetoxy and T is α-methyl.

8. The compound claimed in claim 1 wherein $R^1$ and T taken together is isopropylidendioxy.

References Cited

UNITED STATES PATENTS 3,413,311  11/1968  Cross _____ 260—340.5
3,417,106  12/1968  Cross _____ 260—340.5

FOREIGN PATENTS 6503543  9/1965  Netherlands _____ 260—340.9

ALEX MAZEL, Primary Examiner

J. H. TURNIPSEED, Assistant Examiner

U.S. Cl. X.R.

260—343.2; 424—279

UNITED STATES PATENT OFFICE
CERTIFICATE OF CORRECTION

Patent No. 3,644,421          Dated    February 22, 1972

Inventor(s)  Alexander D. Cross

It is certified that error appears in the above-identified patent and that said Letters Patent are hereby corrected as shown below:

Column 2, line 4, after "pionate," and before "aminoacetate, caproate, enan-" delete -- β-chloropropionate, --.

Column 2, line 8, "claim" should be -- claims --.

Column 2, line 64, "(which can a contain trace or larger amounts of acetic" should be -- (which can contain a trace or larger amounts of acetic --.

Column 4, line 63, "No. 3,048,481," should be -- No. 3,048,581, --.

Column 5, between lines 20 and 21, insert -- 4-oxa-19-nor-5α-pregn-1-en-17α-ol-3,20-dione, --.

Column 5, delete line 22 thereof.

Column 5, line 32, "4-oxa-16α,17α-diacetoxy-5α-pregn-1-ene-,20-dione," should be -- 4-oxa-16α,17α-diacetoxy-5α-pregn-1-ene-3,20-dione, --.

Column 8, between lines 6 and 7, insert -- 4-oxa-16β-methyl-5(α and β)pregnan-20(α and β)ol-3-one, --.

Column 10, line 21, "1-en-17α,20α-ol-3-" should be -- 1-en-17α,20β-ol-3- --.

Column 10, line 23, "1-en-17α,20α-ol-3-" should be -- 1-en-17α,20β-ol-3- --.

Column 10, delete lines 27 through 30 thereof.

Column 10, line 32, "en-17,20α-ol-3-one," should be -- en-17α,20α-ol-3-one, --.

Column 11, line 23, "4-oxa-16β-methyl-5α-pregn-1-en-17α-ol-3,20-dione" should be -- 4-oxa-16β-methyl-5β-pregn-1-en-17α-ol-3,20-dione, --.

Column 11, delete line 24 thereof.

Column 11, delete lines 45 through 50 thereof.

Column 11, lines 74 and 75, after "residue is" and before "pregn-" insert -- chromatographed on silica gel to obtain the 4-oxa-5α- --.

FORM PO-1050 (10-69)

UNITED STATES PATENT OFFICE
CERTIFICATE OF CORRECTION

Patent No. 3,644,421                    Dated February 22, 1972

Inventor(s) Alexander D. Cross          Page -2-

It is certified that error appears in the above-identified patent and that said Letters Patent are hereby corrected as shown below:

Column 12, Claim 1, lines 36 through 39, the formula should appear as follows:

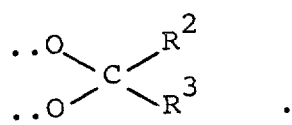

Signed and sealed this 19th day of December 1972.

(SEAL)
Attest:

EDWARD M. FLETCHER, JR.          ROBERT GOTTSCHALK
Attesting Officer                Commissioner of Paten